US009306738B2

(12) United States Patent
Loftus et al.

(10) Patent No.: US 9,306,738 B2
(45) Date of Patent: Apr. 5, 2016

(54) MANAGED SECURE COMPUTATIONS ON ENCRYPTED DATA

(71) Applicant: MICROSOFT TECHNOLOGY LICENSING, LLC, Redmond, WA (US)

(72) Inventors: Jacob J. Loftus, Bristol (GB); Michael Naehrig, Sammamish, WA (US); Joppe Willem Bos, Bellevue, WA (US); Kristin Estella Lauter, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 466 days.

(21) Appl. No.: 13/723,879

(22) Filed: Dec. 21, 2012

(65) Prior Publication Data

US 2014/0177828 A1    Jun. 26, 2014

(51) Int. Cl.
*H04K 1/00*  (2006.01)
*H04L 9/08*  (2006.01)
*H04L 9/00*  (2006.01)

(52) U.S. Cl.
CPC .............. *H04L 9/0852* (2013.01); *H04L 9/008* (2013.01); *H04L 9/08* (2013.01)

(58) Field of Classification Search
USPC ........................................................ 380/255
See application file for complete search history.

(56) References Cited

U.S. PATENT DOCUMENTS 8,515,058 B1 *    8/2013   Gentry ............................ 380/28
2013/0170640 A1 *    7/2013   Gentry ............................ 380/30

OTHER PUBLICATIONS

On-the-Fly Multiparty Computation on the Cloud via Multikey Fully Homomorphic Encryption; Lopez-Alt; May 19, 2012.*
Faster Fully Homomorphic Encryption; Stehle, Steinfeld; Sep. 9, 2010.*
Fully Homomorphic Encryption scheme; Gentry Sep. 2009.*
Qin et al., "An FPGA Design of AES Encryption Circuit with 128-bit Keys", GLSVLSI'05, Apr. 17-19, 2005, 5 pages.
Brakerski, Zvika, "Fully Homomorphic Encryption without Modulus Switching from Classical GapSVP", Stanford University, CRYPTO 2012, 20 pages.
Smart et al., "Fully Homomorphic SIMD Operations", Designs, Codes and Cryptography, Apr. 2014, vol. 71, Issue 1, 19 pages.
Fan et al., "Somewhat Practical Fully Homomorphic Encryption", IACR Cryptology ePrint Archive 2012, 19 pages.
Brakerski et al., "Fully Homomorphic Encryption without Bootstrapping", Association for Computing Machinery, Jan. 2008, 27 pages.
Graepel et al., "ML Confidential: Machine Learning on Encrypted Data", International Association for Cryptologic Research, 2013, 10 pages.

(Continued)

*Primary Examiner* — Christopher Brown
(74) *Attorney, Agent, or Firm* — Sandy Swaim; Sade Fashokun; Micky Minhas

(57) ABSTRACT

The subject disclosure is directed towards secure computations of encrypted data over a network. In response to user desired security settings with respect to the encrypted data, software/hardware library components automatically select parameter data for configuring a fully homomorphic encryption scheme to secure the encrypted data items while executing a set of computational operations. A client initiates the set of computational operations via the library components and if requested, receives secure computation results in return.

20 Claims, 6 Drawing Sheets

(56) References Cited

OTHER PUBLICATIONS

Boyar et al., "A depth-16 circuit for the AES S-box", National Institute of Standards and Technology, 2010, 11 pages.
Lautner et al., "Can Homomorphic Encryption be Practical?", ACM CCSW, 2011, 18 pages.
Gentry et al.,"Fully Homomorphic Encryption with Polylog Overhead", International Association for Cryptologic Research, 2011, 40 pages.
Duan et al., "Practical Private Computation and Zero-Knowledge Tools for Privacy-Preserving Distributed Data Mining", University of California, Berkeley, 2008, 12 pages.
Gentry et al., "Homomorphic Evaluation of the AES Circuit", International Association for Cryptologic Research, Jun. 15, 2012, 34 pages.
Brakerski et al., "Fully Homomorphic Encryption from Ring-LWE and Security for Key Dependent Messages", Weizmann Institute of Science, 2011, 20 pages.
Stehle et al., "Making NTRU as Secure as Worst-Case Problems over Ideal Lattices", Advances in Cryptology—EUROCRYPT 2011, 21 pages.
"Platform-as-a-Service Private Cloud with Oracle Fusion Middleware", An Oracle White Paper, Oct. 2009, 20 pages (Author unknown).
Ramaekers, Coen, "Fully Homomorphic Encryption in JCrypTool", Aug. 4, 2011, 85 pages.
Bos et al., "Leveled Homomorphic Encryption with Smaller Ciphertexts", unknown publication date, 18 pages.
International Search Report and Written Opinion received for PCT Patent Application No. PCT/US2013/077348, mailed Jun. 30, 2014, 20 pages.
Gentry et al., "Better Bootstrapping in Fully Homomorphic Encryption", Public Key Cryptography, Dec. 15, 2011, 22 pages.
Betley, et al., "The cyclotomic trace and curves on K-theory", Topology, Pergamon, Jul. 2005, 30 pages.
Bergh, Petter Andreas, "Ext-symmetry over quantum complete intersections", Archives of Mathematics, May 2009, 6 pages.

* cited by examiner

MANAGED SECURE COMPUTATIONS ON ENCRYPTED DATA

BACKGROUND

Maintaining data confidentiality is an important concern for all computing device users regardless of task(s) performed. Encryption schemes represent one form of technology directed towards securing data when stored in memory and/or transmitted over networks. Fully homomorphic encryption (FHE) refers to an encryption scheme that allows an untrusted server to execute arbitrary computation on encrypted data on behalf of a computing device often referred to as a client.

Conventional solutions for constructing a FHE scheme often incur significant costs due to a reliance on certain mathematical concepts (e.g., ideal lattices) to evaluate any function on encrypted data. In practice, these constructions can be improved using conventional techniques, such as those related to batch-wise or bit-wise encryption, but often remain unworkable for a number of reasons, for example, necessitating deep circuits, such as those based on encryption standards, and/or substantial storage space to process ciphertexts. While some FHE constructions are capable of computing block ciphertexts homomorphically, evaluating a single block using these constructions are several orders of magnitude slower in terms of throughput and latency when compared to evaluating a single block non-homomorphically. Such a performance difference highlights the current impracticality of implementing FHE schemes using these conventional solutions.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards implementing a fully homomorphic encryption scheme to evaluate an encryption standard circuit. In one aspect, a ring-based public key encryption system is fully homomorphic when constructed using well-known lattice problems and/or reduced ciphertexts in order to ensure correctness and security. In another aspect, the fully homomorphic encryption scheme encodes integers by partitioning such integers based upon an encoding parameter such that computations are performed in parallel.

Based upon user input, the fully homomorphic encryption scheme is automatically configured to perform such computations. In one aspect, one or more software/hardware library components select one or more parameters for configuring the encryption scheme to operate efficiently. In one aspect, restricting a cryptographic key space enables higher throughput and reduced memory usage while maintaining security and correctness. In one aspect, a computing device uses a library component to configure the fully homomorphic encryption scheme to perform the computations on the encrypted data.

The library component is configured to provide access to homomorphic functionality. One such function performs a mathematical operation on one or more encrypted data items. In one aspect, the library component is extended with additional homomorphic functions that are built upon other homomorphic functions. The library component is configured to process the user's input, sets bounds on computational operations and either executes such operations or issues errors if correctness cannot be assured. In one aspect, the library component informs the user when decrypted output from a homomorphic function is not equal to the result of a same computation on the input had such input been unencrypted.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
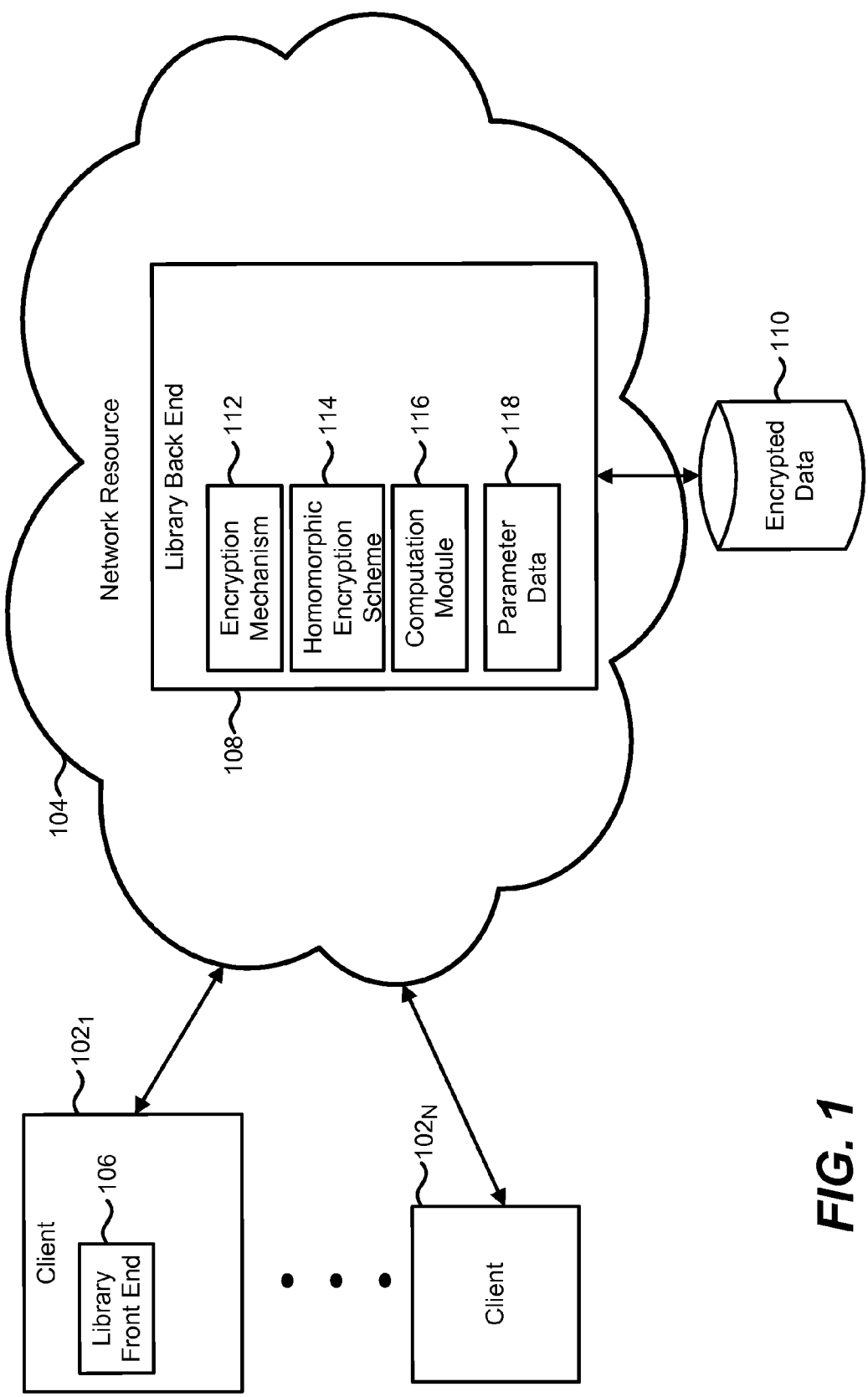
FIG. 1 is a block diagram illustrating an example system for managing secure computations on encrypted data according to one example implementation.

Various aspects of the technology described herein are generally directed towards a library configured to perform computations on encrypted data over a network. Access to the library's functionality may be provided via a network resource, such as a local area network server or a cloud computing environment. The network resource may be untrusted by other computing devices herein referred to as clients. Hence, the client may use the library to prevent any adversarial computing device from deciphering the encrypted data during transmission and/or while stored in memory at the network resource. According to one example implementation, components of the library construct a fully homomorphic encrypted scheme, which may be used to privately outsource computational operations to the network resource when data is being uploaded from distributed computing devices while achieving a certain level of data correctness and security.

Some embodiments of the library implement a leveled fully homomorphic encryption scheme based ideal lattice problems, such as the ring learning with errors problem. One example encryption scheme may be based on the quantum hardness of short-vector problems in ideal lattices. The leveled fully homomorphic encryption scheme described herein reduces ciphertext size and eliminates ciphertext expansion in homomorphic multiplication simplifying key-switching functionality. Such a scheme also may be scale invariant and therefore, negating the use of modulus switching functionality.

The leveled fully homomorphic encryption scheme also may reduce an overall complexity incurred in homomorphic computation by utilizing separate, small plaintext moduli that are later combined (via the Chinese remainder theorem (CRT)) into a larger plaintext modulus. Such a reduction may result in more efficient plaintext/ciphertext sizes and a lower probability of reaching a maximum amount of computation and/or the like. In one example implementation, a data item is first encoded to produce a set of encoded values and then each value is encrypted as a ciphertext. Computations performed on the data item may process each ciphertext individually, which may be facilitated by a small ciphertext size, and combine processing results into a larger ciphertext.

To illustrate one example, encoding integers using a CRT-based technique described herein enhances computation precision since each integer is transformed into to more efficiently-sized (e.g., smaller) integers. The CRT-based technique also enables encoding of large integers by reducing each large integer into smaller integers that are processed separately and combined into a correct result. An Integer up to a bound B may be encoded as a set of integers of which each integer is encoded up to a bound $t_i$. Computational operations may be correctly performed on the set of integers given that each modulus $t_i$ is co-prime and the product over all $t_i$ is greater than bound B. Each integer x mod $t_i$ in the set may be encrypted and then, processed in parallel to return encrypted results which are then decrypted/decoded to recover an original integer.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and secure computations in general.

FIG. 1 is a block diagram illustrating an example system for managing secure computations on encrypted data according to one example implementation. A plurality of computing devices, represented as a plurality of clients 102 in FIG. 2, utilize a network resource 104 to perform various computing tasks. Example components of the example system may further include a library front end 106, running on any example client 102, configured to interact with a library back end 108, running on the network resource 104. The library front end 106 generally refers to a set of functions (e.g., an application programming interface (API)) that communicate various data, instructions, commands and/or the like to a process configured to handle such communications for the network resource 104 as described herein.

The following refers to embodiments in which the network resource 104 facilitates the provision of services, such as computation services, to the example client 102. Various computing devices, including a physical machine or virtual machine herein referred to as a server, may operate within the network resource 104 and perform computations on stored data sets, such as an example data set comprising encrypted data 110. Example architecture for the network resource 104 decouples dedicated hardware from software such that each hardware/software component may be virtualized into units, which then may be further grouped around functionality. When performing a task, the network resource 104 may automate provisioning and configuration of some units such that each unit performs a portion of the task in parallel.

The network resource 104 may configure one or more components of the library back end 108 to operate in various computing environments (e.g., a local computer cluster, a private cloud computing environment, a public cloud computing environment and/or a hybrid computing environment). By encoding/encrypting the example data set and executing various computational operations on the example data set while maintaining the example data set in an encrypted state, the library back end 108 secures the example data set from unauthorized access, modification and/or misappropriation, such as by an untrusted resource.

As described further below, the library front end 108 provides access to an encryption mechanism 112 providing functionality with respect to a homomorphic encryption scheme 114. Such functionality enables a computation module 116 to automatically select parameter data 118 for dynamically executing secure computations on the encryption data 110.

Via a number of implementations of the homomorphic encryption scheme 114, one or more components of the library back end 108 evaluate a standard encryption circuit of a particular depth/level correctly and securely. At least some implementations of the homomorphic encryption scheme 114 include a leveled fully homomorphic scheme in which a user inputs a circuit depth/level (e.g., a depth-three (3)/level-four (4) circuit for 128-bit encryption). Instead of applying a bootstrapping procedure or one that utilizes bit-wise encryption, a leveled homomorphic encryption scheme is scale invariant by limiting inherent noise growth and eliminating the modulus switching technique.

The library front end 108 may be used to build a private cloud computational service for outsourcing computation on the encrypted data 110. The computation module 116 may be configured to automatically establish bounds on data set size for the encrypted data. These bounds may be determined based upon user inputs including desired security level, one or more computational operations, amount and type of data to be handled and/or the like. Each computational operation may refer to a single homomorphic function or a series of such functions. An example homomorphic function may be configured to evaluate encryption circuits, such as through addition or multiplication of ciphertexts. One example implementation of the computation operation combines these functions to provide additional functionality, such as for statistical purposes, predictive modeling, machine learning and/or the like. To illustrate, the user, via the library front end 106, may instruct the library back end 108 to use the addition and/or multiplication functions to compute a mean, a standard deviation, regression values and other statistical data. The library front end 106 may be programmed to use homomorphic evaluation functions to initialize and/or train a linear classifier.

Configuring an instance of the homomorphic encryption scheme 114 to ensure security and correctness may rely upon computational hardness assumptions related to well known lattice problems, such as the Shortest Vector Problem (SVP). Specifically, Ring Learning With Errors (RLWE)-based implementations of the homomorphic encryption scheme 114 utilize polynomial rings, where polynomials are represented as vectors in a lattice, and truncate these polynomial rings using various techniques. Example techniques include reducing a ciphertext size/space and/or a plaintext message size/space by a modulus factor, restricting a cryptographic key space to a bounded distribution, encoding polynomial ring elements using a Chinese Remainder Theorem (CRT)-based technique and so forth. A bounded cryptographic key distribution, from which polynomial ring elements representing cryptographic keys are sampled, for instance, may accomplish key space restriction. Encoding an integer data item, including a large integer, as a collection of smaller integers enables efficient computations on that integer data item.

Generally, the ring learning with errors (RLWE) assumption, which is related to the learning with errors (LWE) assumption, refers to preventing an adversary from distinguishing one sequence of samples from random pairs of polynomial ring elements. It is appreciated that the polynomial ring elements may refer to any type of polynomial, such as a cyclotomic polynomial. By being unable to discern one polynomial from another polynomial, without substantial computing power and time, the adversary cannot reasonably decode computation results based on input polynomials. It is well-understood the RLWE assumption may be reduced to the worst case hardness of short-vector problems on ideal lattices.

Although the homomorphic encryption scheme 114 performs computations on elements of ring R, each element may be encoded using an encoding parameter such that an encoded vector of polynomial coefficients is identical or invertible to the original polynomial. According to one example implementation, for all polynomials that are considered to be elements of ring R, the homomorphic encryption scheme 114 reduces polynomial coefficients modulus q to produce the encoded vector. The encryption mechanism 112 may configure the homomorphic encryption scheme 114 to map each element in R to an integer within an integer domain of size q. Generally, such a mapping may be expressed as function $r_q(a)$ to denote reduction of element a to interval [0, q).

Using the homomorphic encryption scheme 114, the encryption mechanism 112 samples cryptographic keys and/or random error polynomials from Gaussian distributions in each distribution is of a different width and may be bounded to a specific interval. A bounded Gaussian cryptographic key distribution, for instance, represents a restricted key space from which efficient cryptographic keys are generated. A set of cryptographic keys may include a public and a private key derived from a $B_{key}$-bounded distribution; whereas, errors are deduced from a $B_{err}$-bounded distribution. Some example implementations of the homomorphic encryption scheme 114 also generate another cryptographic key referred to as an evaluation key.

Using the homomorphic encryption scheme 114, the library back end 108 may generate ciphertexts that only map to a single ring element in contrast to the two or more as dictated in pure ring learning with errors (RLWE) based schemes. Evaluating the homomorphic encryption scheme 114, in addition, results in little or no ciphertext expansion while executing homomorphic multiplication. The encryption mechanism 112 may rely on a decisional small polynomial ratio (DSPR) assumption to extend a basic construction of the homomorphic encryption scheme 114. For instance, by using a tensoring technique, the homomorphic encryption scheme 114 ensures that the public key distribution is statistically similar to a uniform distribution provided that the cryptographic key elements are sampled from Gaussian distributions of sufficient width.

Figure 2:
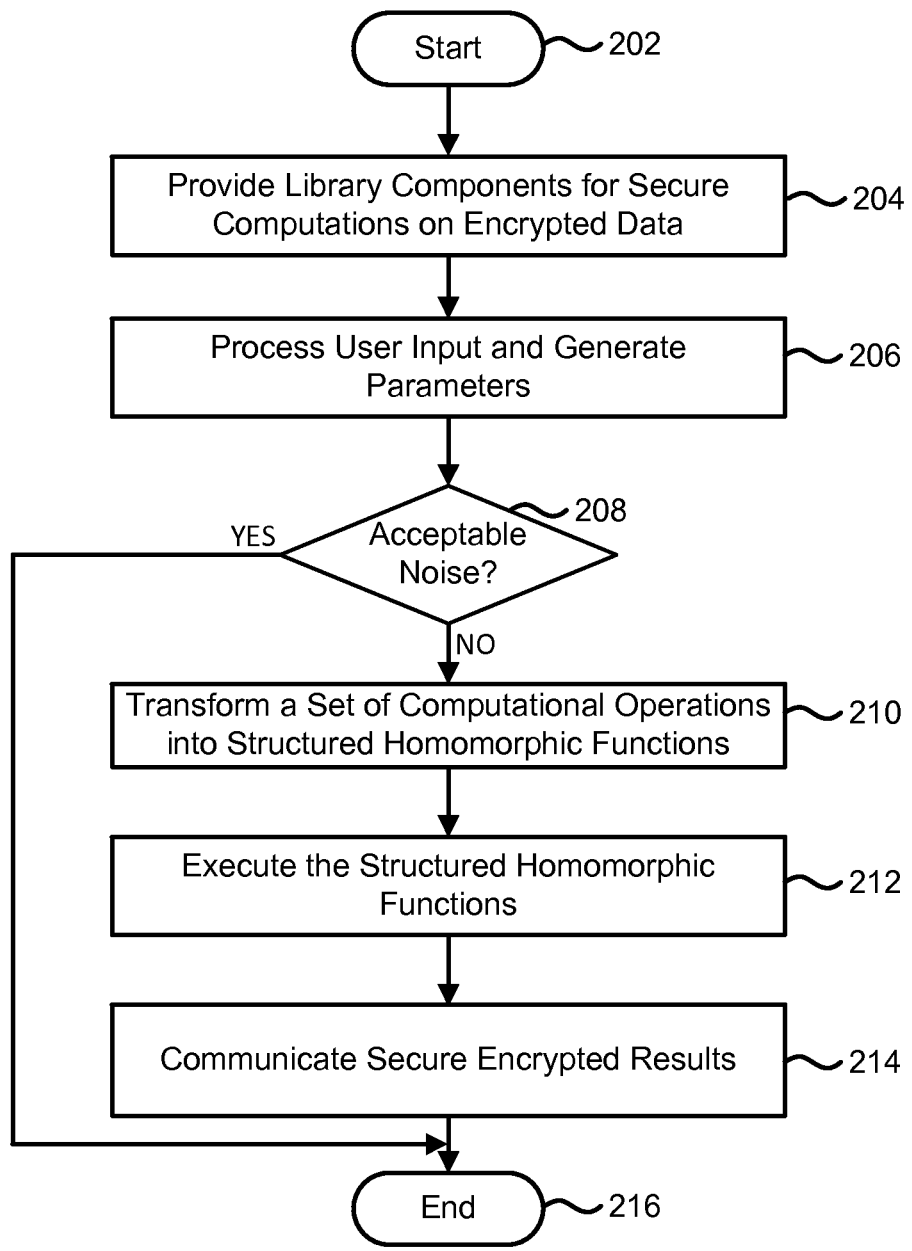
FIG. 2 is a flow diagram illustrating example steps for automatically selecting parameters that direct execution of computational operations according to one example implementation.

FIG. 2 is a flow diagram illustrating example steps for automatically selecting parameters for configuring execution of computational operations according to one example implementation. One or more hardware/software components (e.g., of the library back end 108 of FIG. 1) may be configured to perform the example steps. Such components may form at least a portion of a library facilitating secure computations of encrypted data on behalf of a computing device user operating a client.

One example implementation includes a structural representation of a ring R, such as a polynomial ring. Let d be a positive integer and define $R=\mathbb{Z}[X]/\phi_d(X)$ as the ring of polynomials with integer coefficients modulo the d-th cyclotomic polynomial $\phi_d(X)\in\mathbb{Z}[X]$. The degree of $\phi_d$ is $n=\phi(d)$, where $\phi$ is Euler's totient function. The elements of R may be represented by all polynomials in $Z[X]$ of degree less than n. Elements of ring R are of arithmetic modulo $\phi_d(X)$, which is implicit whenever terms or equalities involving elements in R are described herein.

A vector of coefficients may represent an arbitrary element $a\in R$ as $(a_1, a_2, a_3, \ldots, a_{n-1})$ where $a_i \in \mathbb{Z}$. Hence, a polynomial for a may be expressed as follows:

$$a = \sum_{i=0}^{n-1} a_i X^i$$

In particular, element a can be viewed as an element of the $\mathbb{R}$-vector space $\mathbb{R}^n$. The example library component selects a maximum norm on $\mathbb{R}^n$ to measure the size of elements in R. One example implementation of the maximum norm of a may be computed as follows:

$$\|a\|_\infty = \max_i \{|a_i|\}$$

Let $\chi$ be a probability distribution on R according to which elements are sampled from R. Using notation $a \leftarrow \chi$ to denote that $a\in R$ is sampled, the distribution $\chi$ on R is B-bounded for some $B>0$ if for all elements $a \leftarrow \chi$, an inequality $\|a\|_\infty < B$ holds true.

By way of an example of a distribution $\chi$ on R, a discrete Gaussian distribution $D_{Z,\sigma}$ may be designed with a mean zero(0) and a standard deviation $\sigma$ over the integer set, which assigns a probability proportional to $\exp(-\pi|x|^2/\sigma)$ to each element $x\in\mathbb{Z}$. When d is a power of two (2) and $\phi_d(X)=X^n+1$, $\chi$ may be a spherical discrete Gaussian $\chi=D_{\mathbb{Z}^n,\sigma}$ such that each coefficient of the polynomial is sampled according to the one-dimensional distribution $D_{Z,\sigma}$.

Step 202 commences the example steps of FIG. 2 and proceeds to step 204 where one or more library components for performing computational operations on the encrypted data are provided to the client. To illustrate one example implementation, an example library component comprises instructions configured to compute a set of homomorphic functions, including linear algebra functions (e.g., vector dot product, matrix multiplication and/or the like) and/or more complex mathematical functions.

Step 206 refers to user input processing and parameter generation with respect to executing a set of computational operations. Some user input may indicate a desired security level, a data set size, a computation precision and/or the like. Based upon such user input, the example library component selects parameters to dynamically configure execution of the set of computational operations while rendering secure and correct computation results. One example parameter includes a specific modulus, referred to as modulus q, having a variable or fixed size (e.g., 128-bit or 1024-bit) and being a power of two or, alternatively, being a Mersenne prime. Another example parameter involves setting a degree n of an evaluation polynomial $\phi_d$ equal to $\phi(d)$.

The example library component may, alternatively, use pre-determined parameter data, such as a base field and dimension of ideal lattices. The example library component may modify the parameter data to adapt to new bounds and estimates, assuring correctness and security. Automatically selecting these and/or other parameters prevent substantial inherent noise from causing inaccurate evaluation when executing the computational operations. Step 208 determines whether a noise estimate for the set of computational operations is acceptable.

As described herein, the distribution $\chi$ is used in many fully homomorphic encryption schemes based upon the ring learning with errors (RLWE) problem assumption, such as for sampling random error polynomials that have small coefficients with high probability. Such random error polynomials are a significant part of noise term computations used in the encryption process.

Because an inherent noise term of small norm allows recovery of plaintext (e.g., decrypted data) from ciphertext (e.g., encrypted data), a bound on the inherent noise in a ciphertext, assuming key and error distributions are bounded, ensures correctness in the homomorphic encryption scheme described herein.

To deduce meaningful bounds on inherent noise size and/or growth during homomorphic functions, the distribution $\chi$ is B-bounded for some B. For the discrete Gaussian distribution $\chi$, this assumption is appropriate because sampled elements tend to be small in size with a high probability. Bounding enables sampling from a truncated Gaussian distribution, which is statistically close to the true discrete Gaussian $\chi$ if B is chosen large enough. For example, if the truncated distribution is bounded by $B=6\sigma$, all samples are B-bounded with very high probability.

By computing at least one bound for the noise estimate, the example library component establishes a particular level of computational security and correctness. If the noise estimate fails to satisfy the at least one bound, step 208 proceeds to step 216 where the example steps depicted in FIG. 2 end. If the noise estimate complies with the inherent noise bound, step 208 proceeds to step 210. Step 210 is directed to a transformation between each computational operation and structured homomorphic functions. As an example, computing an average or mean in a set involves a series of homomorphic additions. As another example, computing a dot product between vectors of size N involves N homomorphic multiplications and N−1 homomorphic additions. In yet another example, the computational operation may involve a number of vector dot products and, possibly, other homomorphic functions.

Step 212 executes the structured homomorphic functions. It is appreciated that other implementations may have only one homomorphic function to execute at step 212. Nonetheless, during such execution, the example library component updates the noise estimate and/or inherent noise bound. If the noise estimate exceeds the inherent noise bound, according to one example implementation, the example library component issues errors and/or reconfiguration messages, for example, when a specific (e.g., maximum) amount of computation is reached or if a considerably large data set is entered. Upon completion of the execution of the structured homomorphic functions, the example library component performs step 214 and communicates encrypted results to the client. Step 216 terminates the example steps described herein with respect to FIG. 2.

Figure 3:
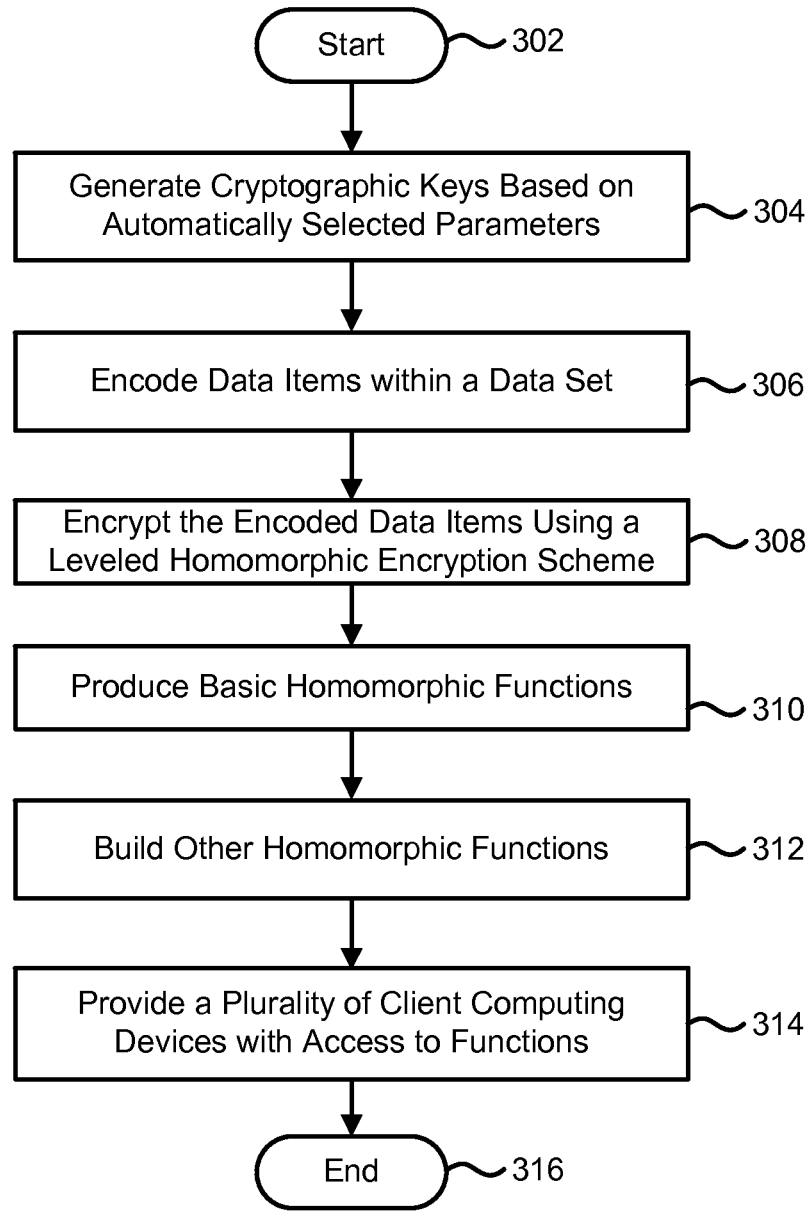
FIG. 3 is a flow diagram illustrating example steps for implementing a leveled homomorphic encryption scheme according to one example implementation.

FIG. 3 is a flow diagram illustrating example steps for implementing a leveled homomorphic encryption scheme according to one example implementation. As described herein, such an encryption scheme may provide a user with provably secure proofs.

The example steps may refer to following leveled homomorphic encryption scheme as constructed by one or more hardware/software components (e.g., of the library back end 108 of FIG. 1). Such a scheme is parameterized by a modulus q and a plaintext modulus t where $1<t<q$. Ciphertexts produced with this scheme are elements of $R=\mathbb{Z}[X]/\phi_d(X)$ and plaintexts are elements of $R/tR$. Appropriate selections of moduli t and q and/or a cyclotomic evaluation polynomial $\phi_d(X)$ defining R facilitate data confidentiality and computational correctness.

Step 302 commences the example steps of FIG. 3 and proceeds to step 304 where one or more library components access a data set and generate a set of cryptographic keys based on automatically selected parameters. For instance, the modulus q may be generalized to a specific power of two (e.g., 128-bit or 1024-bit). Another example parameter involves setting a degree n of the evaluation polynomial $\phi_d$ equal to $\phi(d)$ based upon a user inputted security parameter.

Other example parameters include bounds for distributions on R. For instance, a Gaussian distribution may be $B_{key}$ bounded within a certain number of standard deviations. To demonstrate an example embodiment using $B_{key}=1$, even when the polynomials f', g have coefficients in $\{-1, 0, 1\}$ and the public key h is equal to $[tgf^{-1}]_q$, the public key h remains indistinguishable from a key sampled from a uniform distribution. The standard deviation of an error distribution $\chi_{err}$ on R bounded by $B_{err}$ may be fixed at $\sigma=3:2$. The high probability bound on the size of the coefficients of errors drawn from Gaussian distributions may be selected as $6\sigma$.

The following example instructions (labeled "INSTR" below) correspond to a homomorphic function for generating a private key and a public key referred to as KeyGen(d, q, t, $\chi_{key}$, $\chi_{err}$):

INSTR(1): Sample Polynomials f',g$\leftarrow\chi_{Key}$ and let Polynomial f=tf'+1;

INSTR(2): If Polynomial f∈R is invertible modulo q, there exists a Polynomial $f^{-1}$ such that $ff^{-1}=\tilde{f}$ where $\tilde{f}(X)=\Sigma_i a_i X^i$, with $a_0=1$ mod q and $a_j=0$ mod q for all j≠0, Else if Polynomial f is not invertible modulo q, select a new f' and Repeat;

INSTR(3): Compute the inverse $f^{-1}\in R$ of Polynomial f modulo q and set h=$[tg\ f^{-1}]_q$;

INSTR(4): Output a Public Key and a Private Key pair (pk, sk)=(h,f)∈$R^2$;

Step 306 refers to encoding certain data items within the data set. A data item includes plaintext data mapping to a set of integer coefficients of a representative polynomial in R. The example library component may employ a well-known Chinese Remainder Theorem to determine a modulus q for encoding the plaintext data prior to encryption. Because the polynomial f described herein is invertible modulo q, polynomial coefficients may be reduced by an integer modulo q. Thus, a map $[\cdot]_q$ may reduce an integer x modulo q to a result and represents that result by an element in the interval $(-q/2, q/2]$. The map $[\cdot]_q$ may be extended to polynomials in $\mathbb{Z}[X]$ and R by separately applying an appropriate map entry to each coefficient as denoted by the following:

$$[\cdot]q: R \to R, a = \sum_{i=0}^{n-1} a_i X^i \mapsto \sum_{i=0}^{n-1} [a_i]_q X^i$$

Similarly, the above notation may be modified for vectors of polynomials by applying mappings to vectors entries separately. One alternative implementation uses reduction integer x modulo q to represent any vector coefficient as an element in [0, q). In addition to a modulus q that is used to reduce the coefficients of the elements that represent ciphertexts, there is a second modulus t<q that determines a space defined by R/tR (e.g., referred to as a message space), representing plaintext/decrypted data as polynomials in R modulo t.

Step 308 refers to encrypting the encoded data items using a leveled homomorphic encryption scheme. The following example instructions (labeled "INSTR" below) correspond to homomorphic function referred to as Encrypt(pk, m) for encrypting a plaintext message m where a plaintext message space is defined as R/tR and refers the ring of polynomials in R modulo t:

INSTR(1): For a plaintext message m+tR, select $[m]_t$ as a representative;
INSTR(2): Sample Polynomials s, e←$\chi_{err}$ and Set public key h=pk=$[tg\,f^{-1}]_q$
INSTR(3): Compute a ciphertext message c=$[\lfloor q/t \rfloor [m]_t + e + hs] \in R/qR$;

The following equation corresponds to homomorphic function referred to as Decrypt(sk, c) for decrypting a ciphertext message c:

$$m = \left[ \left\lfloor \frac{t}{q} \cdot [fc]_q \right\rceil \right]_t \in R$$

One example embodiment of the leveled homomorphic encryption scheme described herein includes a word length w (e.g., a positive integer w>1) used to represent integers in a radix-w system. By defining $l_{q,w}=\lceil \log_w(q) \rceil$ where w<q, expression $[a]_q = \sum_{i=0}^{l_{q,w}-1} [a_i]_w w^i$ holds for every element a in R in which each coefficient $a_i$ maps to an interval (−w/2, w/2]. The above expression clearly demonstrates that the norm of $a_i$ in the sum is at most w/2 and therefore, such an expression may be used to determine an evaluation key. Accordingly, ciphertext messages may be partitioned by word w size and after applying a homomorphic function to each portion, the leveled homomorphic encryption scheme combines each portion into a resulting ciphertext message.

Regarding such an embodiment, the following instructions (labeled "INSTR" below) correspond to an example function referred to as KeyGen(d,q,t,$\chi_{key}$,$\chi_{err}$,w) that generates a private key, a public key and an evaluation key:

INSTR(1): Sample Polynomials f', g←$\chi_{Key}$ and let Polynomial f=tf'+1;
INSTR(2): If Polynomial f∈R is invertible modulo q, there exists a Polynomial $f^{-1}$ such that $ff^{-1}=\tilde{f}$ where $\tilde{f}(X)=\sum_i a_i X^i$,
with $a_0=1$ mod q and $a_j=0$ mod q for all j≠0,
Else if Polynomial f is not invertible modulo q, select anew f' and Repeat;
INSTR(3): Compute the inverse $f^{-1} \in R$ of Polynomial f modulo q, Set h=$[tg\,f^{-1}]_q$ and Set $l_{q,w}=\lceil \log_w(q) \rceil$;
INSTR(4): Sample e,s←$\chi_{err}^{l_{q,w}}$ and Compute γ=$[P_{q,w}(f)+e+h\cdot s]_q$;
INSTR(5): Output Crytograhic Key triple (pk, sk, evk)=(h, f, γ)∈$R^2$ An alternative to the above implementations includes a leveled fully homomorphic encryption scheme that is provably secure under the assumed quantum hardness of standard worst-case lattice problems. The following description refers to ring-based encryption systems based on the RLWE assumption and a circular security assumption given the DSPR assumption is satisfied for this setting of parameters. The polynomial ring R is given by R=Z[x]=$X^n$+1 where n is a power of 2 and d=2n. Furthermore, gcd(q,t)=1 and q≡(mod d) such that $X^n$+1 splits into distinct linear factors modulo q. Proving the DSPR assumption holds requires guaranteeing public key uniformity in accordance with any relevant technique. The standard deviation of the Gaussian distribution $\chi_{key}$ needs to be larger than √q, which makes the bound $B_{key}$ larger than √q. Hence, the bound for the inherent noise in an initial ciphertext √q. After executing one homomorphic multiplication function, a tensoring method may prevent the overall inherent noise bound from exceeding a threshold.

Given a security parameter as user input, the example library component outputs a data precision setting modulus q, a word size w, a random error polynomial distribution, a cryptographic key distribution, a degree n of the evaluation polynomial $\phi_d$ equal to $\phi(d)$ and/or the like where d=2n is the power of 2 that determines $\phi_d(X)=X^n+1$ to define R, q>t are moduli. $\chi_{err}=\chi_{\mathbb{Z}^n,\sigma_{err}}^x$ and $\chi_{key}=\chi_{\mathbb{Z}^n,\sigma_{key}}^x$ with standard deviations $\sigma_{err}$ and $\sigma_{key}$, respectively, are discrete Gaussian distributions on $\mathbb{Z}^n$ that sample invertible elements by discarding non-invertible ones. Under such a configuration, the example library component samples e,s←$\chi_{err}^{l_{q,w}}$, computes γ=$[f^{-1}P_{q,w}(D_{q,w}(f) \otimes D_{q,w}(f))+e+h\cdot s]_q \in R^{l_{q,w}}$, and outputs a triple comprising a public key (pk), a private key (sk) and an evaluation key (evk) equal to polynomials (h, f, γ).

Step 310 represents basic homographic function production. The example library component uses parameter data to complete configuration of various homographic function specifications. One example homomorphic function refers to an Add($c_1,c_2$) function defined to compute an addition of input ciphertexts c1,c2 with the following equation:

$$c_{add}=[c_1+c_2]_q$$

Another example homomorphic function includes a Mult ($c_1,c_2$) function that computes a multiplication of input ciphertexts $c_1,c_2$ using an evaluation key evk with the following equation:

$$c_{mult} = KeySwitch\left(\left\lfloor \frac{t}{q} c_1 c_2 \right\rceil, evk\right)$$

As another example homomorphic function, a KeySwitch function transforms the ciphertext $\tilde{c}_{mult}$ encrypting the product $[m_1 m_2]_t$ of plaintext m1 and m2, which is recoverable using the evaluation key evk, into a ciphertext $c_{mult}$ that is capable of being decrypted with the original private key pk. Alternatively, the example library component employs a known key-switching function to build homomorphic multiplication functions.

The example library component may utilize other software/hardware components to perform a modulus reduction where polynomial coefficients are scaled down by a factor, such as a reduction by modulo q. The modulus reduction homomorphic function may be applied to any set of polynomial coefficients in ring R, including plaintext (e.g., decrypted) data and/or ciphertext (e.g., decrypted) data. Accordingly, an original set of coefficients and an encoded set of coefficients are congruent to each other modulo q where q may be equal to two (2), a power of 2, a prime number and or the like). Such a function may be employed to encode the plaintext data prior to encryption, which limits ciphertext size, reduces inherent noise (e.g., magnitude), improve computation latency and/or provide additional benefits. Regarding example implementations that involve encoding data, as described with respect to step 306, a congruency between an original plaintext (message m) and an encoded plaintext (encoded message m') may be expressed via the following equation:

$$m' \equiv m \pmod{q}$$

Step 312 is directed to building other homographic functions. The example library component may utilize software/hardware components to perform a linear algebra function. One example homomorphic function performs a dot product operation of the plaintext message comprising a set of vector coefficients in R with another set of vector coefficients in R. In one example implementation, the example library component builds upon instances of such a dot product homomorphic function to provide homomorphic matrix multiplication functionality where each matrix entry comprises a set of vector coefficients in R. Similar to the Mult( ) and Encrypt( ) functions, a noise estimate homomorphic function may estimate an inherent noise magnitude and project the influence such noise on the security or correctness future computations.

Yet another example homomorphic function computes a noise estimate indicating the noise magnitude when encrypting the plaintext into the ciphertext. This function may couple the noise estimate to the ciphertext with the ring R. Optionally, this function computes a noise estimate associated with an execution of any other homomorphic function, including any of the functions described herein, such as Add( ) or Mult( ), or other homomorphic functions, such as those corresponding to implementing other encryption schemes.

Using the notation described herein, inherent noise terms may be modeled when estimating noise increases for any homomorphic function. The following description includes details on determining bounds for such noise terms when word length is set to w and $l_{q,w} = \lceil \log_w(q) \rceil$ and $v_i$ in R denotes an example inherent noise term in $c_i$. Hence, assuming $c_{add}$ stores results from executing function Add($c_1, c_2$), a corresponding noise term $v_{add}$ is bounded according to expression $\|v_{add}\|_\infty \leq \|v_1\|_\infty + \|v_2\|_\infty + r_t(q)$. If $c_{mult}$ refers to an encrypted product of two ciphertexts, the proceeding inequality bounds a corresponding noise term $v_{mult}$:

$$\|v_{mult}\|_\infty \leq \frac{1}{2}\delta\left(t(2+\delta t B_{key})(\|v_1\|_\infty + \|v_2\|_\infty) + (1+r_t(q))\min_i \|v_2\|_\infty\right) + \frac{1}{2}(1 + (\delta t B_{key})^2 + (r_t(q)\delta t(3+\delta t B_{key})) + \delta^2 t l_{q,w} w B_{key} B_{err}$$

The noise terms described above are directed towards homomorphic addition and multiplication, but such terms may be interpolated when deducing bounds for computational operations involving other homomorphic functions. The obtained bounds can then be used to deduce suitable parameters for automatically configuring future computations for correctness and security using the leveled fully homomorphic encryption scheme described herein.

According to one example implementation in which a leveled tree structure of multiplication functions represents a set of computational operations, ciphertexts at each level are assumed to have inherent noise terms substantially equal in magnitude. Such an assumption may approximate unbalanced inherent noise terms, which results in accurate noise bound estimates.

Hence, the example library component may build a structure comprising a series of Mult( ) functions that are executed iteratively. A homomorphic rounding function may involve a considerable number of consecutive multiplications. The leveled homomorphic scheme may utilize scaling by rational numbers such that the resulting polynomials have rational coefficients instead of integer coefficients. When applied, the rounding function reverts the rational coefficients back into the corresponding integer coefficients. Additional example homographic functions include encryption standard-based functions, such AES functions (e.g., AddKey, SubBytes, ShiftRows, MixColumns and/or the like) and/or the like.

Step 314 refers to providing a plurality of clients (e.g., computing devices) with access to the homographic functions. Via the example library component, any client may interact with and use embodiments of the other homomorphic functions through hardware mechanisms (e.g., microprocessor instruction sets) and/or software mechanisms (e.g., driver-based software libraries). Step 316 terminates the example steps of FIG. 3.

Figure 4:
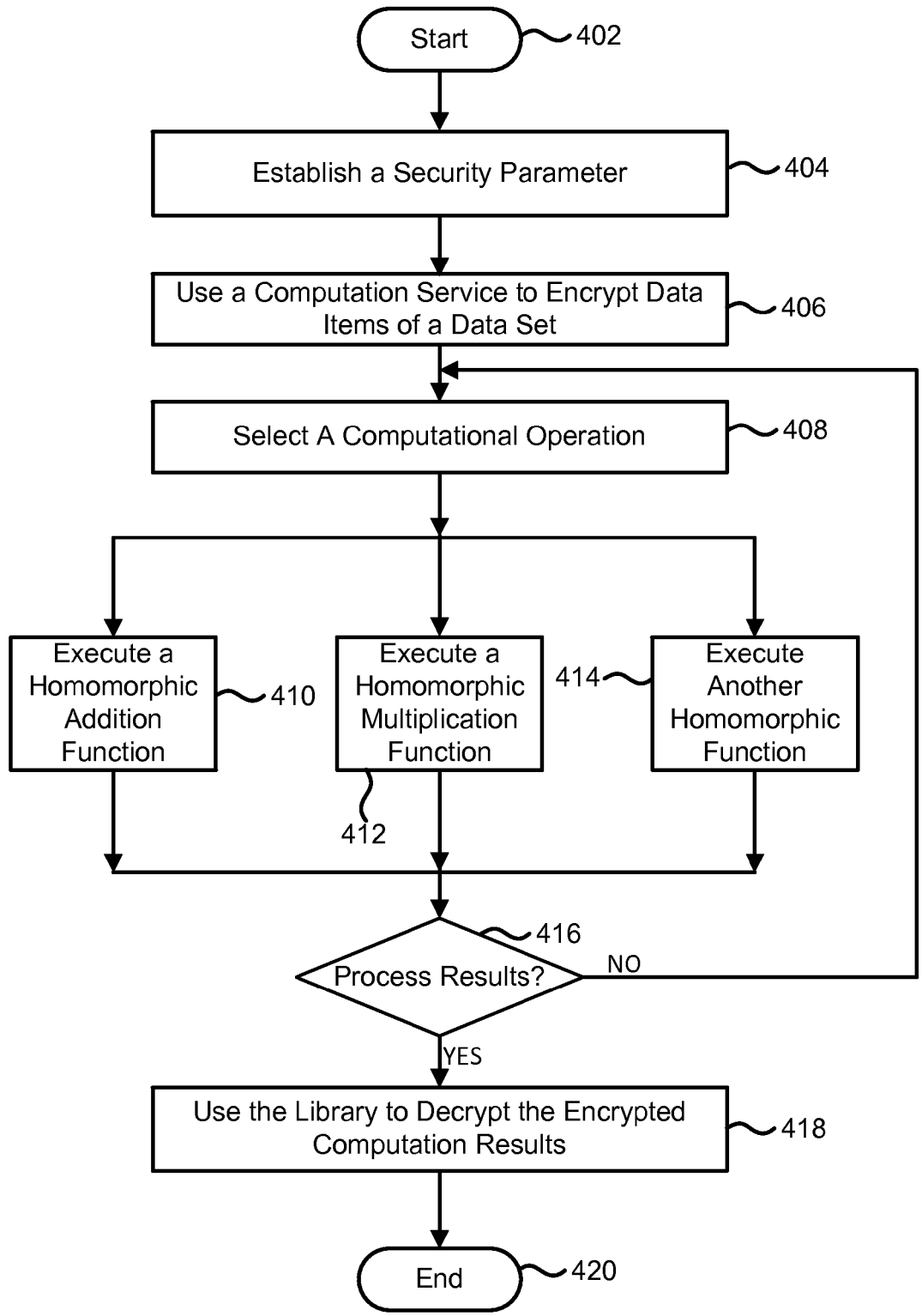
FIG. 4 is a flow diagram illustrating example steps for interacting with a computation service via one or more library components according to one example implementation.

FIG. 4 is a flow diagram illustrating example steps for interacting with a computation service via one or more library components according to one example implementation. The computation service provides access to certain software/hardware-based functionality available on a network resource (e.g., a private cloud computing resource). A user operating a computing device, referred to herein as a client, may use the computation service to automatically configure a leveled fully homomorphic encryption scheme to effectuate these secure computations.

As described herein, an example library component (e.g., a library front end 106 of FIG. 1) may be configured to perform at least some of the example steps by initiating secure computations on encrypted data and/or analyzing any results from such computations. Step 302 commences the example steps and proceeds to step 304 where a security parameter is established. As noted in the present disclosure, the security parameter defines certain desired settings, including a depth level for a standardized encryption circuit. The user, for instance, may request 128-bit fully homomorphic encryption on an AES circuit of depth level N (e.g., 3). By entering the security parameter as input into the computational service, the user may indicate a level of correctness, for example, in terms of precision, and/or security, for example, in terms of indistinguishability to an adversary. The computation service returns a set of additional parameters for configuring the leveled fully homomorphic encryption scheme in a manner that substantially satisfies the security parameter.

Step 406 refers to using the computation service to encrypt data items of a data set. As described herein, using principals founded in the Chinese Remainder Theorem (CRT), the example library component may instruct the computation service to encode each encrypted data item such that the adversary cannot distinguish between that data item and another random data item.

Step 408 selects a computational operation for the computation service to perform. Accordingly, step 408 proceeds to issue a command via step 410, step 412 and/or step 414. If the computation operation refers to a homomorphic addition function, step 408 proceeds to step 410. If the command is directed towards a homomorphic multiplication function, step 408 proceeds to step 412. If the user desires results from another homomorphic function, step 408 proceeds to step 414. Although some computation operations may include a single homomorphic function, other computational operations involve executing structured homomorphic functions in which an arrangement of function calls perform any type of mathematical computation. For instance, a series of function calls may be configured to train a linear classifier.

Step 416 determines whether to process computation results or perform another computational operation. Step 416 returns to step 408 if, for example, the client is running a process engaged in a continuous computations, such as an online machine learning application. Step 416 proceeds to step 418, however, when the computation results are to be analyzed. Because both the encrypted and the computation results remain in an encrypted state throughout the computational operation, the encryption scheme prevents an untrusted resource from deciphering the encrypted data during transmission and/or storage. An adversary on an untrusted host server or otherwise connected to the client, for instance, cannot distinguish between two additions of random data item pairs. Step 418 refers to the example library component using the computation service to decrypt the encrypted computation results. Step 420 terminates the example steps depicted in FIG. 4.

Example Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 5:
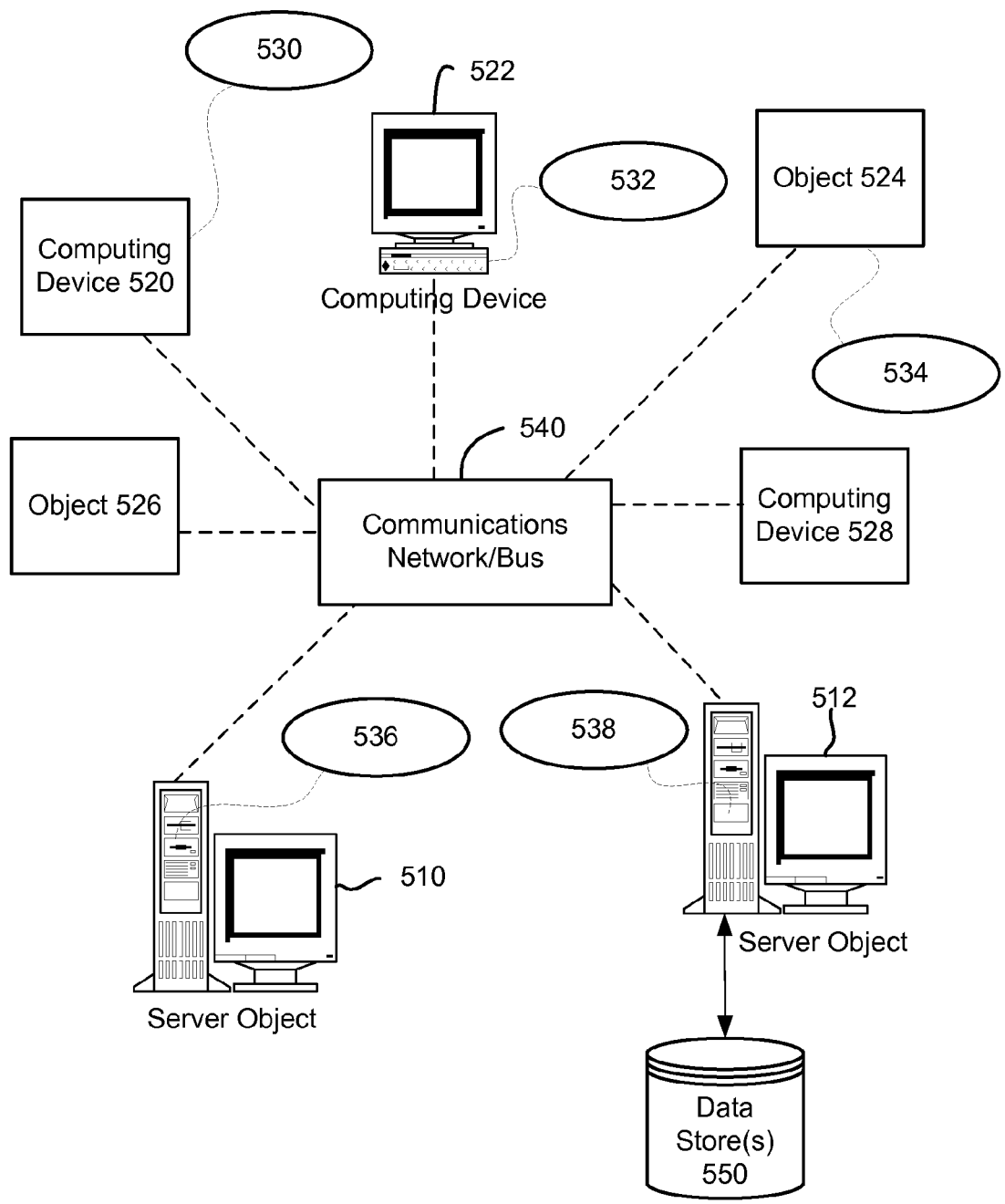
FIG. 5 is a block diagram representing example non-limiting networked environments in which various embodiments described herein can be implemented.

FIG. 5 provides a schematic diagram of an example networked or distributed computing environment. The distributed computing environment comprises computing objects 510, 512, etc., and computing objects or devices 520, 522, 524, 526, 528, etc., which may include programs, methods, data stores, programmable logic, etc. as represented by example applications 530, 532, 534, 536, 538. It can be appreciated that computing objects 510, 512, etc. and computing objects or devices 520, 522, 524, 526, 528, etc. may comprise different devices, such as personal digital assistants (PDAs), audio/video devices, mobile phones, MP3 players, personal computers, laptops, etc.

Each computing object 510, 512, etc. and computing objects or devices 520, 522, 524, 526, 528, etc. can communicate with one or more other computing objects 510, 512, etc. and computing objects or devices 520, 522, 524, 526, 528, etc. by way of the communications network 540, either directly or indirectly. Even though illustrated as a single element in FIG. 5, communications network 540 may comprise other computing objects and computing devices that provide services to the system of FIG. 5, and/or may represent multiple interconnected networks, which are not shown. Each computing object 510, 512, etc. or computing object or device 520, 522, 524, 526, 528, etc. can also contain an application, such as applications 530, 532, 534, 536, 538, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 5, as a non-limiting example, computing objects or devices 520, 522, 524, 526, 528, etc. can be thought of as clients and computing objects 510, 512, etc. can be thought of as servers where computing objects 510, 512, etc., acting as servers provide data services, such as receiving data from client computing objects or devices 520, 522, 524, 526, 528, etc., storing of data, processing of data, transmitting data to client computing objects or devices 520, 522, 524, 526, 528, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 540 or bus is the Internet, for example, the computing objects 510, 512, etc. can be Web servers with which other computing objects or devices 520, 522, 524, 526, 528, etc. communicate via any of a number of known protocols, such as the hypertext transfer protocol (HTTP). Computing objects 510, 512, etc. acting as servers may also serve as clients, e.g., computing objects or devices 520, 522, 524, 526, 528, etc., as may be characteristic of a distributed computing environment.

Example Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 6 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 6:
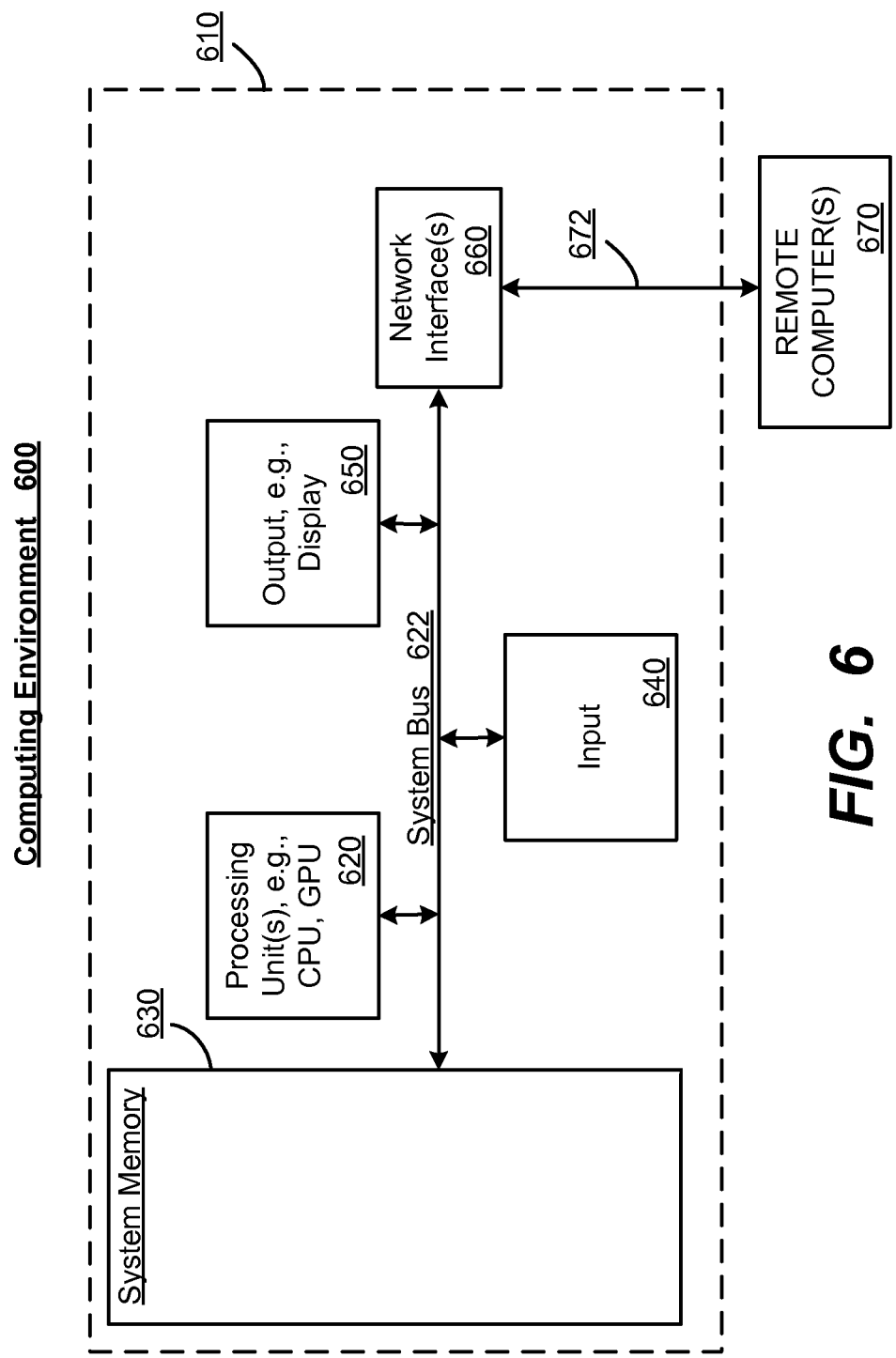
FIG. 6 is a block diagram representing an example non-limiting computing system or operating environment in which one or more aspects of various embodiments described herein can be implemented.

FIG. 6 thus illustrates an example of a suitable computing system environment 600 in which one or aspects of the embodiments described herein can be implemented, although as made clear above, the computing system environment 600 is only one example of a suitable computing environment and is not intended to suggest any limitation as to scope of use or functionality. In addition, the computing system environment 600 is not intended to be interpreted as having any dependency relating to any one or combination of components illustrated in the example computing system environment 600.

With reference to FIG. 6, an example remote device for implementing one or more embodiments includes a general purpose computing device in the form of a computer 610. Components of computer 610 may include, but are not limited to, a processing unit 620, a system memory 630, and a system bus 622 that couples various system components including the system memory to the processing unit 620.

Computer 610 typically includes a variety of computer readable media and can be any available media that can be accessed by computer 610. The system memory 630 may include computer storage media in the form of volatile and/or nonvolatile memory such as read only memory (ROM) and/or random access memory (RAM). By way of example, and not limitation, system memory 630 may also include an operating system, application programs, other program modules, and program data.

A user can enter commands and information into the computer 610 through input devices 640. A monitor or other type of display device is also connected to the system bus 622 via an interface, such as output interface 650. In addition to a monitor, computers can also include other peripheral output devices such as speakers and a printer, which may be connected through output interface 650.

The computer 610 may operate in a networked or distributed environment using logical connections to one or more other remote computers, such as remote computer 670. The remote computer 670 may be a personal computer, a server, a router, a network PC, a peer device or other common network node, or any other remote media consumption or transmission device, and may include any or all of the elements described above relative to the computer 610. The logical connections depicted in FIG. 6 include a network 672, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A system, comprising:
a network resource to provide secure computations on a data set using at least one processor, to configure a leveled homomorphic encryption scheme for the secure computations based upon a noise estimate corresponding to at least one homomorphic function for execution on the data set, to generate a set of cryptographic keys from a truncated polynomial ring representing the leveled homomorphic encryption scheme, wherein the leveled homomorphic encryption scheme defines a single polynomial ring element for each data item in the data set, and to provide access to the at least one homomorphic function wherein the network resource partitions an encrypted data item into a plurality of portions, executes the at least one homomorphic function on each portion, and combines each portion to form a new encrypted data item.

2. The system of claim 1, wherein the network resource is further configured to partition an encrypted data item into a plurality of fixed-sized portions or a plurality of variable-sized portions, execute the at least one homomorphic function on each portion and combine each resulting partition into a resulting encrypted data item.

3. The system of claim 2, wherein the network resource is further configured to transform a set of computational operations into a structure comprising homomorphic function calls, wherein the computation module uses the structure to evaluate an encryption circuit.

4. The system of claim 3, wherein the network resource is further configured to select the encryption circuit based upon user input comprising a security parameter.

5. The system of claim 4, wherein the network resource is further configured to automatically generate parameter data to evaluate the encryption circuit with respect to executing the set of computational operations.

6. The system of claim 1, wherein the network resource is further configured to encode a data item as a set of values using a set of co-prime moduli.

7. The system of claim 6, wherein the network resource is further configured to build another homomorphic function using the at least one homomorphic function.

8. The system of claim 1, wherein the network resource is further configured to reduce a ciphertext size by a modulus factor.

9. The system of claim 1, wherein the network resource is further to restrict a cryptographic key space by sampling invertible elements from the truncated polynomial ring.

10. The system of claim 1, wherein the encryption mechanism is further configured to implement the leveled homomorphic encryption scheme based upon decisional ring learning with errors (RLWE) problem and decisional small polynomial ratio (DSPR) problem, wherein the encryption mechanism performs a quantum reduction in ideal lattices.

11. Computer-readable hardware media having computer-executable instructions, which when executed by a system, cause the system to perform steps comprising:
configuring a leveled homomorphic encryption scheme for executing secure computations based upon a noise estimate corresponding to at least one homomorphic function for execution on a data set;
generating a set of cryptographic keys from a truncated polynomial ring representing the leveled homomorphic encryption scheme, wherein the leveled homomorphic encryption scheme defines a single polynomial ring element for each data item in the data set; and
providing access to the at least one homomorphic function by partitioning an encrypted data item into a plurality of portions, executing the at least one homomorphic function on each portion, and combining each portion to form a new encrypted data item.

12. The computer-readable hardware of claim 11 having further computer-executable instructions comprising:
partitioning an encrypted data item into a plurality of fixed-sized portions or a plurality of variable-sized portions;
executing the at least one homomorphic function on each portion; and
combining each resulting partition into a resulting encrypted data item.

13. The computer-readable hardware of claim 11 having further computer-executable instructions comprising: restricting a cryptographic key space by sampling invertible elements from the truncated polynomial ring.

14. A method, comprising:
configuring a leveled homomorphic encryption scheme to perform secure computations on a data set using at least one processor, the leveled homomorphic encryption scheme based upon a noise estimate corresponding to at least one homomorphic function for execution on the data set;
generating a set of cryptographic keys from a truncated polynomial ring that represents the leveled homomorphic encryption scheme, wherein the leveled homomorphic encryption scheme defines a single polynomial ring element for each data item in the data set;

partitioning an encrypted data item into a plurality of portions;

executing the at least one homomorphic function on each portion; and combining each portion to form a new encrypted data item.

15. The method of claim 14 further comprising partitioning an encrypted data item into a plurality of fixed-sized portions or a plurality of variable-sized portions, execute the at least one homomorphic function on each portion and combine each resulting partition into a resulting encrypted data item.

16. The method of claim 14 further comprising transforming a set of computational operations into a structure comprising homomorphic function calls and using the structure to evaluate an encryption circuit.

17. The method of claim 16 further comprising selecting the encryption circuit based upon user input comprising a security parameter.

18. The method of claim 17 further comprising automatically generating parameter data to evaluate the encryption circuit with respect to executing the set of computational operations.

19. The method of claim 14 further comprising encoding a data item as a set of values using a set of co-prime moduli.

20. The method of claim 14 further comprising restricting a cryptographic key space by sampling invertible elements from the truncated polynomial ring.

* * * * *